United States Patent [19]

Mayhugh et al.

[11] 3,962,586
[45] June 8, 1976

[54] SENSITIZED THERMOLUMINESCENT PHOSPHOR AND METHOD

[75] Inventors: Michael R. Mayhugh; Gary D. Fullerton, both of Madison, Wis.

[73] Assignee: Wisconsin Alumni Research Foundation, Madison, Wis.

[22] Filed: Nov. 13, 1974

[21] Appl. No.: 523,322

[52] U.S. Cl. ............................. 250/484; 250/461 R
[51] Int. Cl.² ......................................... H05B 33/00
[58] Field of Search ........................... 250/484, 461

[56] References Cited
UNITED STATES PATENTS

| | | | |
|---|---|---|---|
| 3,141,973 | 7/1964 | Heins et al. | 250/484 |
| 3,402,293 | 9/1968 | Shambon | 250/484 |
| 3,413,235 | 11/1968 | Jones et al. | 250/484 |
| 3,453,430 | 7/1969 | Muller | 250/484 |

*Primary Examiner*—Harold A. Dixon
*Attorney, Agent, or Firm*—McDougall, Hersh & Scott

[57] ABSTRACT

A luminescent phosphor for use in radiation dosimetry in which the phosphor is pre-treated by exposure to ultraviolet radiations while simultaneously heating to elevated temperature after the phosphor has first been subjected to radiations in excess of $10^3$ rads.

17 Claims, 4 Drawing Figures

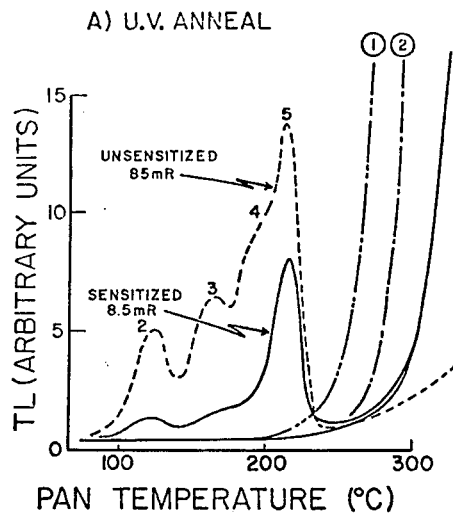

A) U.V. ANNEAL

The TL induced by 85 mR in an unsensitized ribbon (dashed curve) and by 8.5 mR in a ribbon sensitized by $8 \times 10^4$ R and a 45 min u.v.-anneal at 290°C (solid curve). The first dot-dash curve shows the residual TL (no irradiation) after sensitization with a 15 min u.v.-anneal. The second dot-dash curve results after a u.v.-anneal totaling 45 min. Regression to the solid curves' residual TL comes after several readings to 300°C.

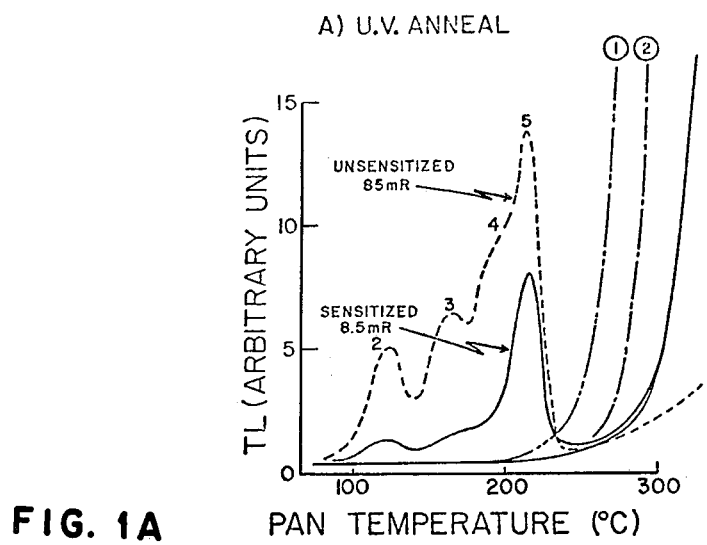

FIG. 1A

The TL induced by 85 mR in an unsensitized ribbon (dashed curve) and by 8.5 mR in a ribbon sensitized by $8 \times 10^4$ R and a 45 min u.v.-anneal at 290°C (solid curve). The first dot-dash curve shows the residual TL (no irradiation) after sensitization with a 15 min u.v.-anneal. The second dot-dash curve results after a u.v.-anneal totaling 45 min. Regression to the solid curves' residual TL comes after several readings to 300°C.

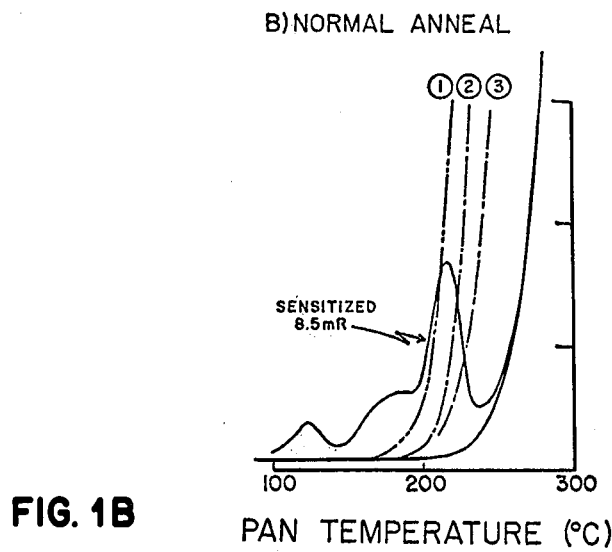

FIG. 1B

The TL induced by 8.5 mR in a ribbon sensitized by $8 \times 10^4$ R and a 16.2 h 290°C anneal in the dark. The dot-dash curves show the residual TL when the anneal totals: 1) 15 min, 2) 45 min, 3) 165 min.

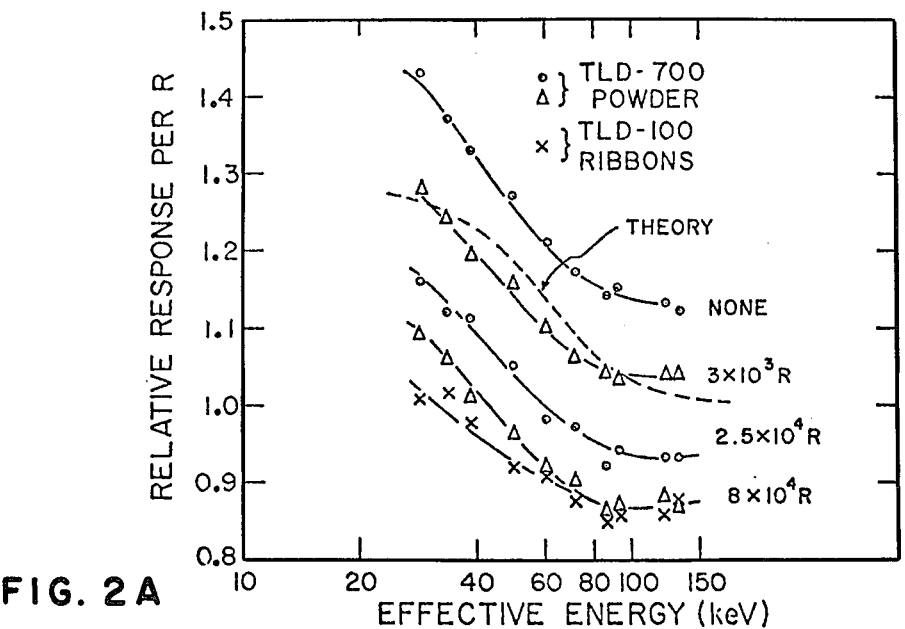

FIG. 2A

The response of LiF dosimeters to 100 R at various effective energies relative to their response to 100 R of $^{60}$Co radiation. The dosimeters are either unsensitized ("NONE") or sensitized by the indicated exposures followed by 1 h at 290°C. The dashed curve shows the variation expected from changes in dose ("THEORY").

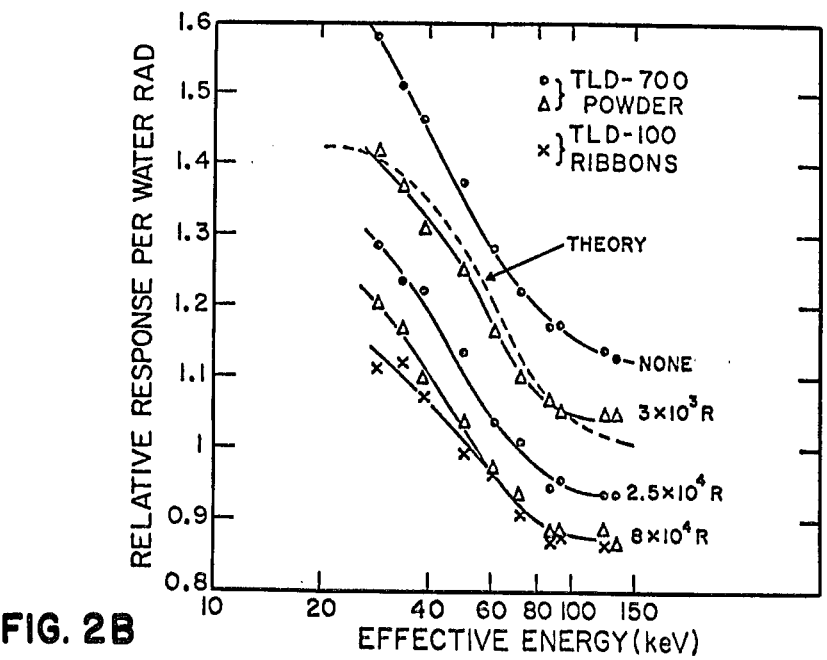

FIG. 2B

The data of Fig. 2A replotted to illustrate the variation in relative response per water rad.

SENSITIZED THERMOLUMINESCENT PHOSPHOR AND METHOD

The Government has rights in this invention pursuant to NSF Grant No. GH 34585 awarded by the National Science Foundation.

This invention relates to dosimeters for measurement of absorbed radiation and it relates more particularly to the treatment to increase the utility of radiation absorbent materials used in such dosimeters.

Radiations, such as X-rays, gamma-rays, beta-rays, and other forms of penetrating radiations are found in varying amounts in the environment and in increased amounts in hospitals, clinics, laboratories, and other establishments where such radiations and other penetrating radiations are used. It is desirable to guard against the possibility of exposure to unsafe amounts of such radiations and it is for this purpose that use is made of radiation dosimeters. Such radiations dosimeters are also employed in connection with the therapeutic use of X-rays, gamma-rays and other forms of penetrating radiation in the treatment of patients, such as in the treatment of cancer cells with radiations of cobalt, radium and the like, use being made to monitor and record the amount of radiation which is being employed and the amount which is absorbed by the patient.

There are a number of radiation dosimetry systems. One common system involves the use of film containing badges or tags which are worn by persons who may possibly be exposed to such radiations. Such badges contain photographic film which is surrounded by opaque material so that the film is protected from exposure to light. X-rays, gamma-rays and other penetrating radiation will pass through the opaque material and cause darkening of the film when it is developed. Periodically the film is removed from each badge and is developed and inspected to determine whether the film has been exposed to penetrating radiation. This dosimetry system finds objection from the standpoint that the procedures involved in developing and checking the film are time consuming and costly. Moreover, this sytem is not well adapted for accurately measuring the dosage of penetrating radiation to which each film has been exposed.

This invention is concerned with a system that involves the luminescence which is produced in certain phosphor materials when they are exposed to X-rays, gamma rays and other forms of penetrating radiation.

In the drawing:

FIGS. 1A and 1B graphically illustrate thermoluminescent phosphor response under ultra violet and normal anneal conditions FIGS. 2A and 2B show the TLD response of phosphors at various radiation intensity and dosage.

In this dosimetry system, each worker or patient wears a badge or the like containing a small piece or sample of such luminescent material. In the case where the phosphor is thermoluminescent each piece is checked periodically for thermoluminescence by heating the material to elevated temperature while observing and measuring any light which may be emitted in response to heat. The amount of light may be measured by an optical system to focus it upon a photomultiplier tube, employed in conjunction with the associated electronic amplifiers and electrical measuring equipment. If the sample has been exposed to X-rays or other penetrating radiations, it will emit light as it is heated through certain characteristic temperature ranges. When the emitted light is plotted against the temperature, one or more peaks will be observed at characteristic temperatures. In general, the magnitude of these peaks is a measure of the amount of radiation exposure. Where the phosphor is radiophotoluminescent rather than thermoluminescent, the luminescence is stimulated by light rather than by heat.

It has been found for many thermoluminescent phosphors that the amount of thermoluminescence (TL) increases with the amount of exposure to radiation after which the increase is supralinear. Where supralinearity begins will vary somewhat, depending on the phosphor. For example, with lithium fluoride, supralinearity begins at about $10^3$ rads. In other words, the sensitivity of lithium fluoride as a phosphor, as measured by the TL produced per rad, increases for exposures above $10^3$ rads. Near $10^4 - 10^6$ rads, the TL saturates and the response stops growing.

It has been the practice to increase the sensitivity of the phosphor by pre-exposure to levels of radiation above the level at which supralinearity begins, followed by annealing the phosphor, after the sensitization exposure, by heating to elevated temperature. This means for sensitization has been effective, the degree of sensitization being larger the larger the exposures in the range where supralinearity begins up to saturation, whereafter the sensitivity begins to decrease. For lithium fluoride this would be in the range of $10^3$ rads where supralinearity begins to about the saturation level at about $10^5$ rads. With other phosphors supralinearity may begin at other levels such as 50 rads or $10^4$ rads. Under such circumstances where, for example, supralinearity begins at 50 rads or $10^4$ rads, then the sensitization will begin when pre-exposure exceeds 50 rads or $10^4$ rads, which marks the beginning of the supralinear range.

The high exposure before annealing is thus called the sensitizing or pre-exposure. After exposure, the dosimeter exhibits linear response beyond the point where supralinearity would otherwise begin and up to about the level of pre-exposure. This has operated greatly to expand the useful linear range of dosimeters based on thermoluminescence (TL).

In thermoluminescent phosphors, two types of trapping centers exist, which are generally referred to in the trade as TL traps and interfering or deep traps. During irradiation for sensitization, the traps take on electrons or holes and those traps which take on electrons or holes are known as TL centers and interfering centers. During subsequent heating some of the entrapped electrons or holes become loose. In radiophotoluminescent phosphors analogous centers can exist. These are called radioluminescent centers and interfering centers.

To the present, such procedures for sensitizing phosphors, have not been useful for measurement in the mrads range because the anneal, near 300° C, in the case of lithium fluoride leaves some thermally stable deep centers while erasing the less stable TL centers. Other phosphors may be annealed at any temperature between the temperature of useful TL peaks and the temperature of fusion of the phosphor without the elimination of deep centers.

These deep centers interfere with low level measurements in a number of ways. Such deep centers often cause TL peaks of their own during measurement to determine the type and amount of radiation absorbed thereby to give confusing or false results, especially at temperatures above the TL peaks. The tails of these high temperature interfering peaks can be large enough to mask the dosimeter peaks. Over long periods of time, electrons or holes can leave deep centers and fill dosimetry TL peaks to form corresponding dosimetry TL centers which give a dosimetry TL signal even through the material has not yet been exposed to radiation.

Attempts have been made to eliminate the deep centers by an increase in the annealing temperature. These deep centers can sometimes be eliminated by annealing at higher temperatures, such as above 300° C for LiF, but unfortunately such high annealing temperatures also eliminate the increased sensitivity so that little is accomplished by the sensitization of phosphors by the route of explosure plus annealing.

It is an object of this invention to provide a method for sensitizing thermoluminescent materials of the type described wherein use thereof as dosimetry material can be made in the mrad range; in which interfering centers can be reduced or eliminated without loss of sensitivity of the thermoluminescent material; which lowers the level at which exposure is detectable; which extends the linearity of responses of the phosphor and which improves the tissue equivalence of the phosphor so that in some cases the relative response to photons will differ only slightly from the dosage absorbed by human or other tissue especially at effective energies above 30 keV.

It has been found, in accordance with the practice of this invention, that a synergistic type reaction takes place when the thermoluminescent material (phosphor), such as LiF, is subjected simultaneously, after the sensitizing pre-exposure, to ultraviolet radiation while being annealed at elevated temperature. Under such circumstances, the interferences from deep centers are substantially eliminated without noticeable deterioration of the sensitization at the TL peaks.

Not only are the deep centers substantially completely eliminated to render the interferences insignificant, but the minimal detectable exposure is reduced by a factor as much as five-fold whereby the dosimeter can be used to detect radiations of 2 mrads where previously the minimal detectable level was 10 mrads, for example.

A further significant benefit of the ultraviolet (UV) anneal combination of this invention resides in the ability to complete the improved sensitization in lesser time and at reasonable temperatures, such as a temperature which need not exceed 300° C for LiF. As a result, use can be made of phosphors embodied in particle or powder form in carriers which could not previously be used because of their thermal instability or thermal flow limitation, such as in plastic materials.

Besides eliminating deep interference centers, without loss of sensitivity, and lowering the minimum detectable exposure at lower annealing temperatures, the process alters the energy response of the thermoluminescent material to become more like tissue of human or animal nature. Thus the dosimeter readings will identify an amount of radiation absorption which will correspond more to the amount of actual absorption in the exposed tissue.

The unique results heretofore described were wholly unexpected because there was no reason to believe that UV radiation simultaneous with annealing would eliminate interferences and, at the same time, alter energy response. It was well known that one could reduce interferences but not without loss of sensitivity and linearity.

The unique results experienced by the combination of UV radiation during heating to elevated temperature to eliminate deep centers will permit the revival of the use of lower cost, readily available phosphors. Radiophotoluminescent glasses although sufficiently sensitive find limited application as dosimeter phosphors because of the presence of interfering centers believed to result from impurities that are present. The anneal-ultraviolet exposure of this invention will reduce the interfering centers in these materials sufficiently to revive their use as dosimeters.

The process will also permit the use of natural phosphor materials which have interfering centers when mined due to pre-radiation in the earth. For example, fluorite minerals have interfering centers as mined due to pre-radiation in the earth but such interfering centers can be eliminated or materially reduced, in accordance with the practice of this invention, by exposure to ultraviolet while at the same time heating.

In general, phosphors preferably employed in the practice of this invention comprise crystalline or glassy substances which are doped to "activate" or enable the production of useful luminescence. Such dopants comprise impurities which, when known, are identified with the host crystal and separated by a colon. Representative of such other host crystals are calcium sulfate, lithium borate, beryllium oxide and preferably lithium fluoride and calcium fluoride.

The dopants are often rare earth metals, manganese, titanium and the like. The following will identify some of the doped phosphors which develop TL centers and interfering centers upon pre-exposure and from which interfering centers can be eliminated upon the subsequent simultaneous UV-anneal of this invention.

$CaSO_4$: Dy (calcium sulfate doped with dysprosium)
$Li_2B_4O_7$: Mn (lithium borate doped with manganese)
LiF : Mg, Ti (lithium fluoride doped with magnesium and titanium)
$CaSO_4$: Tm (calcium sulphate doped with thulium)
$CaF_2$: Mn (calcium fluoride doped with manganese)
$CaF_2$: Dy (calcium fluoride doped with dysprosium)
$CaF_2$: Tm (calcium fluoride doped with thulium)

Phosphors and doped phosphors need not further be described since such phosphors and their method of formulation are well known to the trade. Lithium fluoride is a preferred phosphor for use in the practice of this invention since it is close to tissue response and is brought even closer to tissue equivalence by the practice of this invention.

Exposure to ultraviolet can be made throughout the heating step to anneal the phosphor but it is sufficient to provide for ultraviolet exposure for only a portion of the heating cycle, preferably for about 1/10 – 9/10 of the heating cycle. For example, a 50 minute exposure during a 1 hour anneal can give the desired results. The time of anneal without UV can be increased but without corresponding benefit.

Ultraviolet light in the range of 400–100 namometers is preferred. The range can be extended to the visible and infrared range and include 750-400 namometers to eliminate interfering centers in response to simultaneous exposure and annealing, but such higher range of radiations are not as effective nor as active as the ultraviolet radiations. The heating temperatures are the conventional temperatures.

The foregoing concepts have been confirmed experimentally:

For this purpose use was made of dosimetry grade LiF in both powder form (TLD-100, TLD-700 of Harshaw Chemical Company) and as high sensitivity ribbons (TLD-100, 3.2 × 3.2 × 0.9 mm$^3$, Harshaw Chemical Company). All exposures of 100 R or more were read on a Harshaw model 2000 reader heating at about 7-8°C/sec. The integrated TL emission constitutes a reading, and the data points are an average of two readings for ribbons and four readings for powders.

Two Champion G15T8 germicidal lamps, spaced about 3.5 cm between tube centers, provided ultraviolet light for radiation. Simultaneous heating was accomplished in an aluminum boat placed on a hot plate and covered with a fused silica window. A thermocouple amidst the dosimeters was used to monitor temperature. The lamps were held about 10 cm from the samples, giving a nominal intensity in the 254 nm line of about 3mW/cm$^2$, a value derived from typical performance data. Sometimes annealing was carried out in the boat without ultraviolet illumination for purposes of comparison, but usually conventional ovens were used with thermocouple monitors. Before any further treatment, all samples were treated at 400°C for 1 hour in the dark.

Sensitizing exposure below 4 × 10$^3$ R were performed on a $^{60}$Co therapy unit at 107 R/min while, above 4 × 10$^3$ R, a laboratory $^{137}$Cs unit was used at 1700 R/min. Low exposure irradiations came from a 100 mCi of $^{137}$Cs source at a few mR/min. All irradiations were at room temperature and for $^{137}$Cs and $^{60}$Co, behind adequate build-up layers.

A General Electric Maxitron X-ray unit provided X-rays for energy dependence curves. Exposures were at 100 R from $^{60}$Co on the therapy unit. Both the $^{60}$Co and X-ray exposures were determined with a Victoreen R meter. The high energy chamber, used for $^{60}$Co and $^{137}$Cs calibrations, was calibrated at 1.25 MeV ($^{60}$Co energy). The medium energy chamber (Victoreen No. 70-5), used for the X-ray calibrations, was also calibrated at 43 and 117 KeV effective. Measurements at other energies relied on interpolations based on the manufacturer's typical response cureve. This curve is relatively flat from 30 to 130 KeV effective. Table I summarizes the calibration data for the effective energies used.

TABLE I

| KVp | Filter | HVL | Effective KeV | R/min* |
|---|---|---|---|---|
| 250 | Th III | 2.95 mm Cu | 134 | 30.0 |
| 250 | Th II | 2.58 mm Cu | 124 | 36.3 |
| 250 | 0.5 mm Cu + 1 mm Al | 1.40 mm Cu | 93 | 62.6 |
| 200 | 0.5 mm Cu + 1 mm Al | 1.07 mm Cu | 87 | 35.8 |
| 200 | 0.25 mm Cu + 1 mm Al | 0.78 mm Cu | 72 | 46.5 |
| 140 | 0.25 mm Cu 1 mm Al | 0.57 mm Cu | 61 | 20.9 |
| 140 | 4.0 mm Al | 7.2 mm Al | 50 | 29.8 |
| 140 | 1 mm Al | 4.26 mm Al | 39 | 49.0 |
| 100 | 1 mm Al | 3.32 mm Al | 34 | 27.2 |
| 100 | no filter | 2.33 mm Al | 29 | 39.1 |

*At 70 cm from the focus

For calibrations, the chamber was placed at the field center (wide-open for X-rays and 10 × 10 cm for $^{60}$Co), care being taken not to introduce scattering materials other than the collimators. When the TL-phosphors were irradiated in the same fields, however, scatterers were present. For X-rays, the dosimeters were above a large, 1.4 mm thick lucite support, and for $^{60}$Co they were behind a 5 mm polystyrene sheet which covered the field and served as a build-up layer. In the case of X-rays, back-scatter was measured with TL to contribute about 2.5% to the exposure, while for $^{60}$Co, forward scatter should increase the exposure about 1%.

After irradiation, dosimetry LiF typically displays four prominent glow peaks above room temperature, as shown by the dashed curve in frame A of FIG. 1. The peaks are numbered for identification. The dashed curve results from an 85 mR exposure on a ribbon dosimeter previously annealed for an hour at 400°C and cooled to room temperature in about 1 minute. This anneal emphasizes glow peaks 4 and 5 near 200°C, the ones normally used for dosimetry. The other two peaks may be eliminated by pre-annealing near 80°C before irradiation or by post-annealing near 100°C after irradiation.

A ribbon sensitized by high exposure (8 × 10$^4$R) and ultraviolet exposure with simultaneous anneal at 290°C for 45 minutes, in accordance with the practice of this invention, gives the solid curve in frame A of FIG. 1 after only 8.5 mR. Comparing the dashed curve, it will be seen that the sensitivity is greatly improved since the height of peak 5 is reduced to roughly one-half even though the exposure is reduced by a factor of ten. These two curves also show that the sensitized ribbon has a residual TL signal visible above 250°C which is not seen in the unsensitized material. This residual TL does not interfere with the dosimetry peaks, a fact emphasized by the lower solid line which results from heating the sensitized ribbon without exposure. If the simultaneous UV exposure and anneal is applied for only 15 minutes after the high exposure, the residual TL is nearer to the dosimetry peak, as shown by the dot-dashed line labeled 1 in frame A of FIG. 1. In fact, after a total of 45 minutes of ultraviolet-anneal, the residual TL follows the second dot-dashed line, and only after several readings (a brief heating), some to 300°C, does it follow the solid curves. In any event, the residual TL does not interfere with the dosimetry TL and re-growth of the TL peak is also eliminated.

For comparison, frame B in FIG. 1 shows the glow curve of a ribbon sensitized in the manner of the prior art by high exposure at 8 × 10$^4$ R followed by annealing at 290°C for 16.2 hours. Here too the sensitivity is increased and the residual TL is sufficiently removed to allow measurement. Anneals of shorter duration do not accomplish this removal, as demonstrated by the dot-dashed lines. Unlike the ultraviolet-anneal of this invention, reading to 300°C does not further remove the residual TL.

It will seem from FIG. 1 that sensitization in accordance with the practice of this invention has no particular advantage over that using a long anneal without UV illumination except the convenience of a shorter treatment time. The crucial difference is observed in longer term irradiations. For illustration, the background radiation level was measured with ribbons sensitized by the ultraviolet-anneal concept of this invention; the previously employed dark-anneal; and the unsensitized ribbon. Ribbons sensitized with the UV-anneal of this invention agree with the unsensitized ribbon, but the ribbon sensitized by a 16 hour dark-anneal indicate an exposure nearly twice as high. It will be obvious that some of the TL in this latter case does not result from irradiation, indicating that re-growth problems are not solved by the dark-anneal.

The degree of sensitization, referred to as the sensitization factor, is determined by dividing the response per R from a sensitized dosimeter by that from an unsensitized one. As is well known, the maximum sensitization factor depends on the samples' history and on the quantity (peak height or area) taken to characterize the TL. For instance, if the height of peak 5 is taken in FIG. 1, frame A, then the sensitization factor is 5.6, but if the combined areas of peaks 3, 4 and 5 are used, the factor will be only 3.5. If the glow curves are simplified by annealing 24 hours at 80°C before a $^{60}Co$ test irradiation, then area measurements show sensitization to a factor of 5. Since this latter value results from conditions likely to be used for dosimetry, and since the value is intermediate, compared to other conditions, this factor of 5 can be cited for the maximum sensitization. Maximum sensitivity results from a pre-exposure near $10^5$ R.

Besides increasing response, sensitization in accordance with the practice of this invention makes LiF more nearly tissue equivalent than unsensitized LiF. FIG. 2A shows the variation of the response to 100 R of $^{60}Co$ radiation. The upper curve represents normal LiF subjected to 400°C for 1 hour and 24 hours at 80°C to eliminate the low temperature peaks. The other curves result from similar treatment, except that after the 400°C anneal, a sensitizing exposure was given followed by an hour's annealing at 290°C and finally at 80°C for 24 hours. For the samples with no pre-exposure, the response is generally higher than expected from changes in the mass absorption coefficient relative to air. For a pre-exposure of $3 \times 10^3$ R, the response more nearly matches theory. Increasing the sensitizing exposure lowers the response in the 30–150 KeV effective range up to $8 \times 10^4$ R. This last curve is taken both for TLD-700 powder (triangles) and TLD-100 ribbons (crosses). The phosphors were sensitized using a normal anneal without ultraviolet because, at these exposure levels of 100 R, the UV-anneal is not needed, but the energy dependence is the same for dosimeters treated with the UV-anneal.

Important to environment monitoring or personnel dosimetry is the energy variation of the response with respect to tissue rather than to air. In other words, the response per tissue rad is more important than the response per R (Roentgen). In FIG. 2B, the data of FIG. 2A is replotted by calculating the response per water rad relative to the response to $^{60}Co$. radiation. The TLD-100 ribbons and the TLD-700 powder, after $8 \times 10^4$ R exposure, are more nearly water (tissue) equivalent than for the other sensitizing exposures. For energies above 30 KeV, the response of the ribbons does not vary from the dose to water by more than 15%. Since water and soft tissue are nearly equivalent, it will be seen that with the sensitized material cannot only lower exposure be detected, but also the response more nearly reflects the dose to tissue.

Usually, dosimetry LiF is annealed at 400°C to prepare for re-use, yet this treatment destroys the desirable properties of the sensitized dosimeters. To avoid this problem, read-out was terminated at 280°C and the dosimeters were annealed at 280°–290°C for 15 minutes to prepare for reuse. Compared to 280°–290°C, the 400°C re-anneal is important only to eliminate sensitization effects which could alter normal LiF. In the phosphor sensitized by $10^5$ R this would not occur for exposures below about $10^4$ such that the 280°C anneal is sufficient.

Actually, two cases should be considered, that is, application in the mR range and application at intermediate levels of $10$-$10^3$ R. In the latter instance, high temperature TL does not interfere appreciably and the UV-anneal of this invention is not necessary for sensitization and reuse with a 280°–290°C anneal is possible. In the case of mR, the UV-anneal of this invention is necessary for sensitization to eliminate interfering high temperature centers. The reuse after low exposure does not require the UV-anneal since a 280°–290°C anneal in the dark is sufficient. However, if the specially treated ribbons are exposed in the intermediate range of $10$–$10^3$ R, the interfering TL grows sufficiently to require several hours at 280°–290°C and preferably re-application of the UV-anneal, before reuse. The preferred procedure is to apply the UV-anneal of this invention for sensitization, and then limit the sensitized dosimeters to use in the mR range so that no subsequent UV-anneal will be required.

The ultraviolet-anneals were confirmed on ribbon dosimeters because they are easier to handle but it will be understood that the essential effects for powder have also been verified. Powder is often used in carriers such as Teflon or silicone rubber and the fact that sensitized powders need not be heated to above 300°C for sensitization or reuse in accordance with the practice of this invention is a distinct advantage since these binders are thermally unstable at higher temperatures.

Sensitized LiF responds to ultraviolet light such as germicidal lamps, but apparently not to room fluorescent light. On account of the UV sensitivity, the UV-anneal is usually terminated by turning off the lamp, then removing the dosimeters a few minutes later so that any light induced TL is eliminated from the start.

The following tests were performed to ascertain the uniformity of the UV-anneal sensitizing procedure of this invention. Twenty virgin ribbons were first irradiated at 100 mR, then read, giving a spread in readings characterized by a standard deviation of ±2.8%. The ribbons were sensitized with $8 \times 10^4$ R followed by one hour of UV-anneal at 285°C. Again they were irradiated at 100 mR and read, this time with a spread of ±2.5%. Thus the procedure of this invention is applicable to large batches without loss of reproducibility. For these measurements, photon counting was used so that even at this moderately low exposure, the variations in response result from the ribbons themselves and not from fluctuations in electrical noise or spurious TL.

Some TL systems exhibit glow peaks at temperatures high enough so that they would be expected to be stable at room temperature and yet they fade. The entities causing sensitization might also disappear at room temperature, even though they are moderately stable at 280°C. To evaluate this possibility, several ribbons were sensitized by $8 \times 10^4$ R and a 90 minute ultraviolet-anneal at 290°C and their sensitivity was measured at intervals over several weeks. At first, the sensitivity decreased about 10% on a peak height basis but thereafter remained constant for at least three months. This demonstrates that the sensitized dosimeters are applicable to long term distribution, as in personnel monitoring. In another experiment, the integrated TL was taken as the measure and a 60 minute 100°C post-anneal was used to isolate peak 5. In this instance, no initial drop in sensitivity was noticed.

Usually dosimetry LiF is annealed at 400°C to prepare for reuse, yet this treatment will destroy the desirable properties of the sensitized dosimeters. To avoid this problem the dosimeter should be read out to 280°C, and annealed at 280°–290°C to prepare for reuse, usually for 15 minutes. If the specially treated ribbons are exposed in the intermediate range ($10$–$10^3$ R), the interfering TL grows sufficiently to require several hours at 280°–290°C, or even re-application of the UV-anneal, before reuse. The best approach is to apply the UV-anneal of this invention for sensitization, then take care that these dosimeters are used exclusively in the mR range so that no subsequent UV-anneal is ever required.

Dosimeters sensitized in accordance with the practice of this invention embody a number of additional advantages.

1. They show improved tissue equivalence in the energy dependence of their response. (The relative response reflects the dose to tissue ±15% from 30 keV to 1.25 MeV for $8 \times 10^4$ R pre-irradiation.)

2. The UV-anneal procedure is applicable to large batches without damaging reproducibility (Standard deviation in 20 ribbons read before sensitization, $\sigma = \pm 2.8\%$; after sensitization, $\sigma = \pm 2.5\%$.)

3. After sensitization using the UV-anneal, light induced TL appears not to be a problem, at least for exposures to room fluorescent lights.

4. Pre-irradiation followed by the UV-anneal is a practical way to obtain a five-fold improvement in the lowest exposure detectable with dosimetry LiF. The procedure is simple and inexpensive.

it will be understood that changes may be made in the details of operation and sensitization without departing from the spirit of the invention, especially as defined in the following claims.

We claim:

1. A thermoluminescent phosphor suitable for use in radiation dosimetry in which the phosphor has been simultaneously exposed to radiations within the range of 750–100 nanometers while heated to elevated temperature with the corresponding elimination of interfering centers.

2. A thermoluminescent phosphor as claimed in claim 1 in which the radiations to which the phosphor is exposed are in the range of ultraviolet radiations.

3. A thermoluminescent phosphor as claimed in claim 1 in which the phosphor is a TL phosphor.

4. A thermoluminescent phosphor as claimed in claim 1 in which the phosphor is one that has or which develops interfering centers.

5. A thermoluminescent phosphor as claimed in claim 1 wherein the phosphor has been pre-sensitized by exposure to radiations which exceed the onset of supralinearity.

6. A thermoluminescent phosphor as claimed in claim 5 in which the phosphor is lithium fluoride and in which the phosphor has been pre-exposed to radiations above $10^3$ rads.

7. A thermoluminescent phosphor as claimed in claim 6 in which the phosphor is pre-exposed to radiations within the range of $10^3 - 10^6$ rads.

8. A thermoluminescent phosphor as claimed in claim 1 in which the phosphor is annealed by heating to a temperature which does not exceed 400°C.

9. A thermoluminescent phosphor in which the phosphor is selected from the group consisting of lithium fluoride and calcium fluoride, with or without doping impurities.

10. In the method for pre-sensitizing a thermoluminescent phosphor for use in radiation dosimetry, the steps of annealing the phosphor by heating to elevated temperature simultaneously with exposure of the phosphor to radiations within the range of 750–100 mm for at least a portion of the annealing cycle to eliminate interfering centers present in the phosphor.

11. The method as claimed in Claim 10 in which the phosphor is selected from the group consisting of lithium fluoride, calcium fluoride, doped lithium fluoride and doped calcium fluoride.

12. The method as claimed in Claim 10 in which the phosphor is exposed to ultraviolet radiation during the heating to elevated temperature.

13. The method as claimed in claim 10 in which the interfering centers are naturally present in the phosphor.

14. The method as claimed in claim 10 in which the interfering centers are introduced into the phosphor by pre-exposure for sensitization.

15. The method as claimed in claim 14 in which, when the phosphor is formed of lithium fluoride or a doped lithium fluoride, the phosphor is exposed to radiations above $10^3$ rads for pre-sensitization.

16. The method as claimed in claim 15 in which the phosphor is pre-exposed to radiations above $10^3$ rads up to $10^6$ rads.

17. A luminescent phosphor suitable for use in radiation dosimetry in which the phosphor has been simultaneously exposed to radiations within the range of 750–100 nanometers while heated to elevated temperature with the corresponding elimination of interfering centers.

* * * * *